United States Patent [19]

Goncze

[11] Patent Number: 5,398,717
[45] Date of Patent: Mar. 21, 1995

[54] FLUID VALVE

[75] Inventor: Zoltan Goncze, Oostburg, Wis.

[73] Assignee: Kohler Co., Kohler, Wis.

[21] Appl. No.: 227,925

[22] Filed: Apr. 15, 1994

[51] Int. Cl.[6] .................................................. F16K 11/06
[52] U.S. Cl. ........................................ 137/270; 251/288
[58] Field of Search ................ 137/270; 251/284, 286, 251/288, 285

[56] References Cited

U.S. PATENT DOCUMENTS

| | | | |
|---|---|---|---|
| 2,468,281 | 4/1949 | Wildern | 251/286 |
| 3,831,621 | 8/1974 | Anthony et al. | 137/270 |
| 3,964,514 | 6/1976 | Manoogian et al. | 251/285 X |
| 4,387,880 | 6/1983 | Saarisalo et al. | 251/285 |
| 4,397,330 | 8/1983 | Hayman | 137/270 |
| 4,651,770 | 3/1987 | Denham et al. | 137/270 |
| 4,793,375 | 12/1988 | Marty | 137/270 |
| 4,821,765 | 4/1989 | Iqbal et al. | 137/270 |
| 4,901,750 | 2/1990 | Nicklas et al. | 137/270 |
| 4,981,156 | 1/1991 | Nicklas et al. | 137/270 |

Primary Examiner—Martin P. Schwadron
Assistant Examiner—Kevin L. Lee
Attorney, Agent, or Firm—Quarles & Brady

[57] ABSTRACT

A removable cartridge type valve which affords right and left hand conversion in the same valve. A stop member which affords the conversion is preferably positioned outwardly of the valve housing so that the conversion can be made without turning off the water supply. The stop member requires only a rotation of 90° on the valve stem and also serves to retain the valve stem in a valve housing.

9 Claims, 3 Drawing Sheets

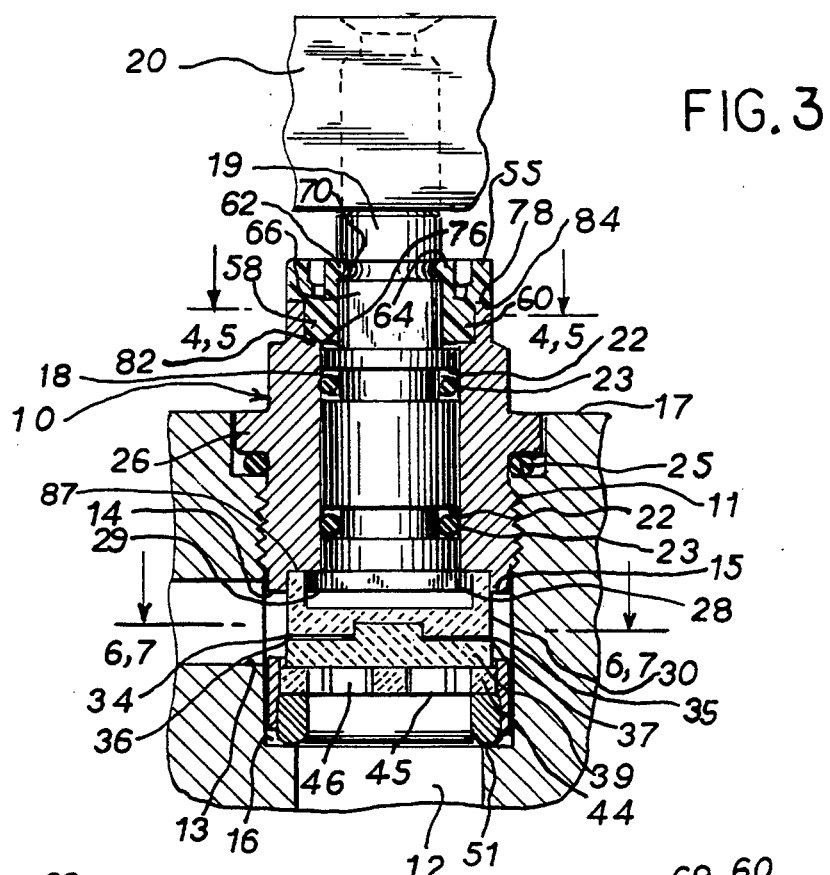
FIG. 3
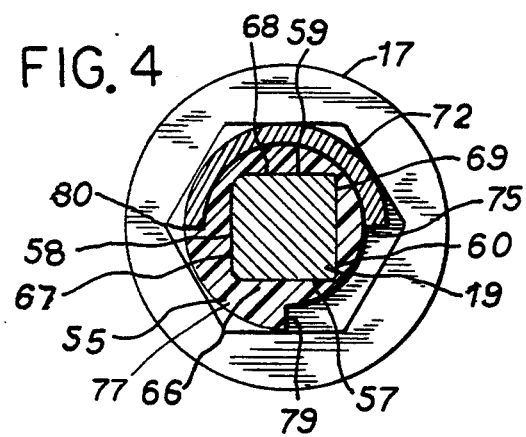
FIG. 4
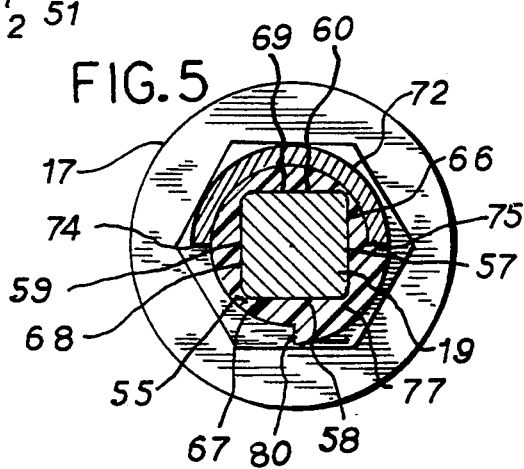
FIG. 5
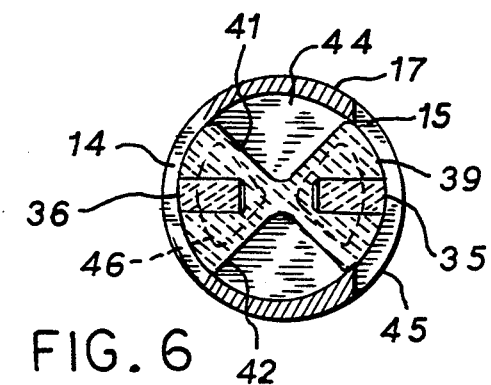
FIG. 6
FIG. 7

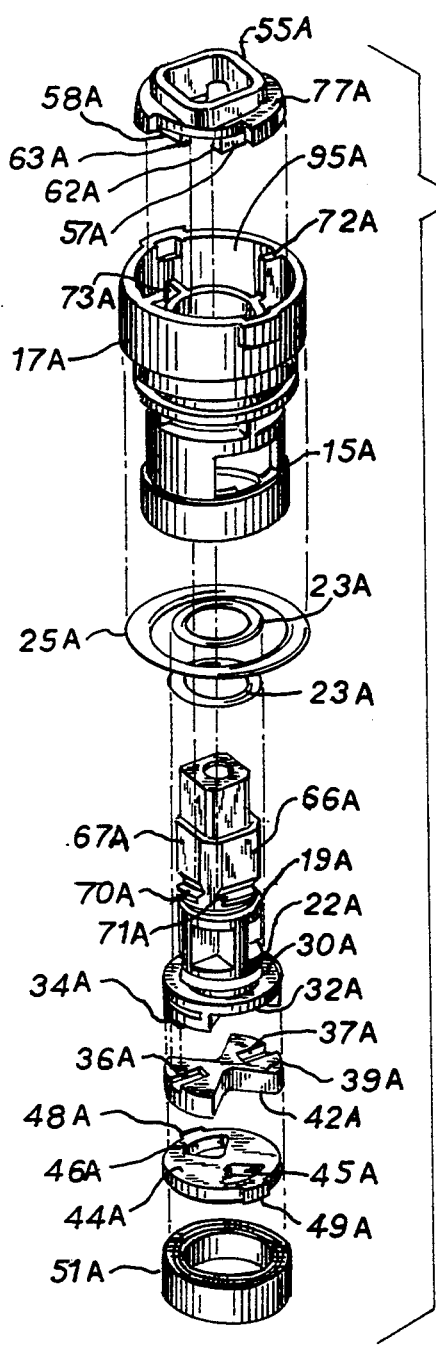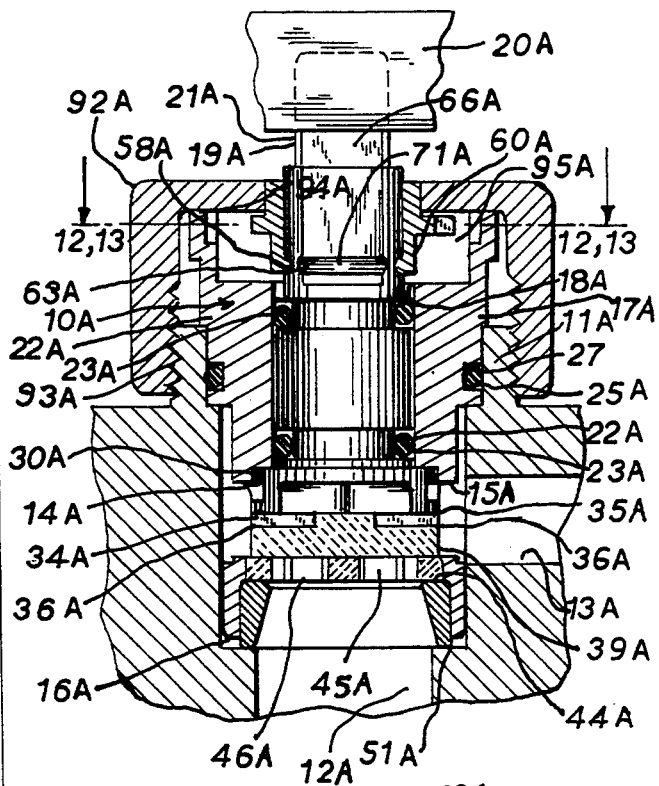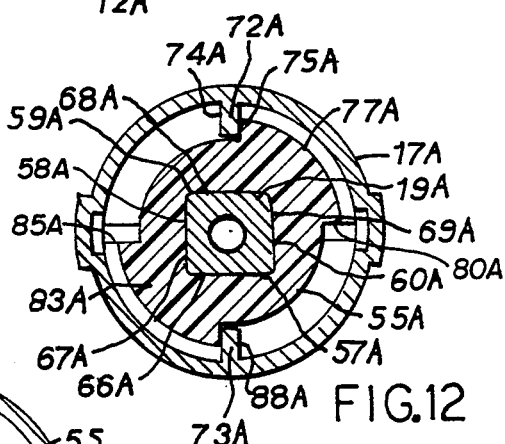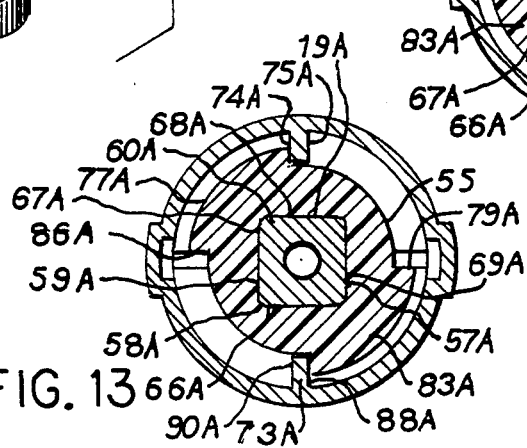

FLUID VALVE

A. FIELD OF THE INVENTION

This invention relates primarily to faucets which use replaceable valve cartridges. More particularly, it relates to a ¼ turn valve suitable for use in clockwise or counterclockwise installations.

B. DESCRIPTION OF THE ART

"Non-rise" ceramic disk cartridge valve units are well known. See e.g. U.S. Pat. Nos. 4,651,770 and 4,821,765. A problem common to valves of this type is the need for an inexpensive and easy means for converting the valve from clockwise (e.g. cold water) operation to counterclockwise (e.g. hot water) operation at the time of installation (so as to avoid the need for manufacturing and inventorying two different valves). The prior art has sought to solve this problem using a number of different approaches, none of which has all the advantages of the present invention.

One of the problems associated with valves of this type is that most cannot be converted from a cold to a hot water operation or vice versa under pressurized conditions. This means that the source of water supply must be shut off and the valve unit taken apart in order to obtain access to a valve component. While a conversion stop ring is disclosed in U.S. Pat. No. 3,831,621 for use outside the valve body, it does not afford valve stem retention or an immediate indication of stop ring orientation for cold and hot water conversion.

Another problem with cartridge valves of this type is in the assembly of the multiple components which can become easily disassembled.

Thus, it can be seen that a need exists for an improved valve of this type.

SUMMARY OF THE INVENTION

In one aspect, the invention provides a fluid valve having a valve body with an axial bore for receiving fluid from an inlet and providing fluid to an outlet. At least one stop surface is disposed at an upper portion of the valve body.

A stationary valve element and a movable valve element are both positioned in the valve body for regulating fluid flow through the valve in response to rotation of the movable element over the stationary element. A rotatable spindle is positioned within an upper end of the axial bore of the valve body, the spindle having one end extending outside the valve body and an opposite end for causing the movable valve element to move.

A stop member is positioned around the spindle so as to rotate therewith, the stop member having a projection for abutting against the valve body stop surface in a rotational position of the spindle. The stop member also includes at least one projecting member for engagement with a groove on the rotatable spindle so as to restrict axial movement of the stop member along the spindle.

In one embodiment, the spindle and stop member are constructed and arranged so that when the stop member is axially removed from the spindle, rotated essentially 90° and axially repositioned on the spindle, the valve can be converted from a right hand to a left hand operation, or from a left hand to a right hand operation.

In another embodiment the projecting member consists of a plurality of resilient arms integrally formed with each other.

In one aspect, the spindle has at least two peripheral flat faces positioned 90° from each other and positionable outside the valve body when the valve is assembled.

In another embodiment, the valve body stop surface is defined by an outwardly extending rib member which extends circumferentially about 180° from an upper surface of the valve body and has opposing stop surfaces, and the stop surface of the stop member is defined by an outwardly extending wall portion which extends circumferentially about 90° from a lower surface of the stop member.

In yet another aspect, the valve is of the cartridge type and is particularly suitable to a faucet housing having at least one inlet in its bottom and a side outlet.

In yet another embodiment, the stop member is positioned outside the valve body which can be an open cavity member and has stop surfaces.

The objects of the invention therefore include:
a. providing a valve of the above kind which is readily convertible to either right or left hand operations;
b. providing a valve of the above kind which can be readily convertible to either right or left hand operation under pressurized conditions;
c. providing a valve of the above kind which is easily assembled;
d. providing a valve of the above kind which is reduced in size; and
e. providing a valve of the above kind which can be manufactured with few parts and thus at reduced costs.

These and still other objects and advantages of the invention will be apparent from the description which follows. In the detailed description below, preferred embodiments of the invention will be described with reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

FIG. 3 is a view in cross section showing the valve assembly of FIG. 1 mounted in a faucet housing;

FIG. 4 is a sectional view taken along line 4—4 of FIG. 3;

FIG. 5 is a sectional view taken along line 5—5 of FIG. 3 showing the valve orientated 90° from FIG. 4;

FIG. 6 is a sectional view taken along line 6—6 of FIG. 3 showing the valve in the closed position;

FIG. 7 is a view taken along line 7—7 of FIG. 3 showing the valve in the open position;

FIG. 10 is a view similar to FIG. 2 showing an alternative embodiment of the valve assembly;

FIG. 11 is a view similar to FIG. 3 of the alternative embodiment;

FIG. 12 is a sectional view taken along line 12—12 of FIG. 11; and

FIG. 13 is a view taken along line 13—13 and illustrating the stop member oriented 90° from the FIG. 12 showing.

DESCRIPTION OF THE EMBODIMENTS

Figure 1:
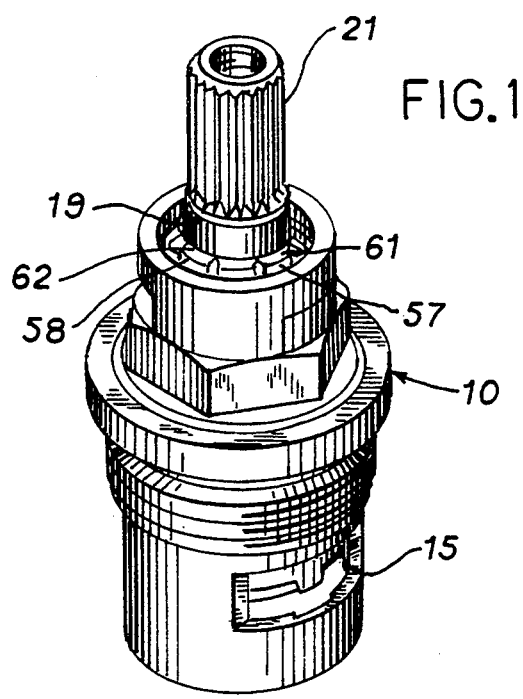
FIG. 1 is a perspective view showing a valve assembly constituting one of the embodiments of the invention.
Figure 2:
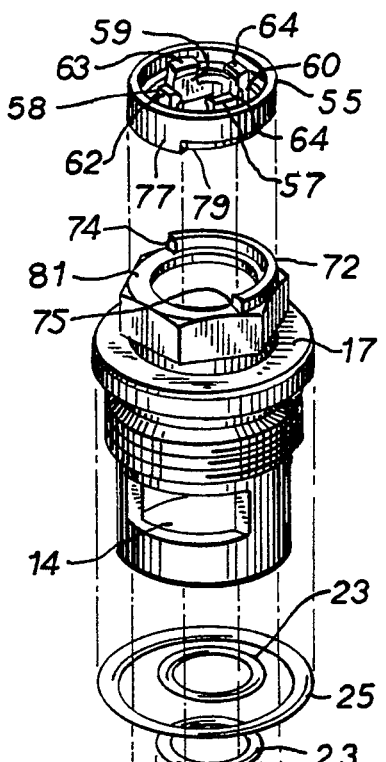
FIG. 2 is an exploded view of the valve of FIG. 1.

Referring to FIGS. 1, 2 and 3, the cartridge valve assembly, generally 10, is shown in conjunction with a threaded faucet housing 11. The faucet housing has the usual bottom water inlet 12, side water outlet 13, and a valve cartridge receiving cavity 16. The pathway of water through the cartridge valve is from the inlet 12 up through the valve through the side openings 14 and 15 and out through cavity 16 and the housing outlet 13.

Brass valve body 17 has a bore 18 for receiving a brass valve stem 19 or spindle, and the usual handle knob 20 is placed on a splined upper/outer end 21. Grooves 22 in the stem 19 receive o-ring type seals 23. An additional larger seal 25 is placed between the flange 26 of the housing 17 and the faucet housing 11.

As seen in FIGS. 2 and 3, at the bottom of the stem, there is a driving bar 28 for reception in groove 29 of a driving member 30. The driving member 30 has two relief areas such as shown at 32, as well as extending portions 34 and 35 to fit into grooves 36 and 37 of movable valve element 39. The relief areas 41 and 42 of the movable valve element 39 afford passage of water from the openings 45 and 46 of the stationary valve member 44 in the usual manner when the relief areas 41 and 42 are moved over the openings 45 and 46. The stationary valve member is held in a stationary manner by the extensions 48 and 49 extending into complementary grooves (not shown) of the valve body 17. A gasket 51 provides a seal between the housing 11 and the bottom of stationary valve member 44.

An important feature of this invention is the stop member 55 positioned at the upper end of the valve stem 19 and surrounding it. The stop member has four resilient arms 57, 58, 59 and 60 from which extend projecting members 61, 62, 63 and 64, respectively. Reference is made to FIGS. 4 and 5 where it is seen that the valve stem 19 has four stop faces 66, 67, 68 and 69 against which are seated arms 57–60 and provide corresponding stop faces such as shown at 56.

Figure 9:
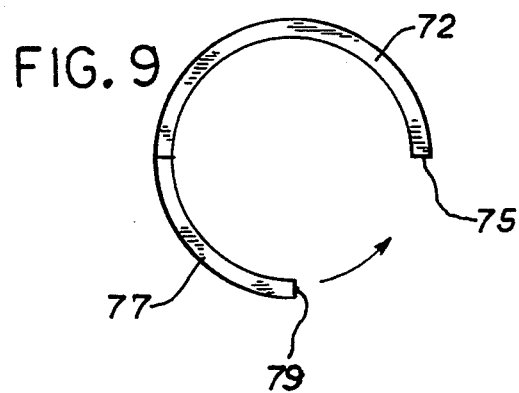
FIG. 9 is a view similar to FIG. 8 showing left hand orientation.

Referring to FIGS. 2, 4 and 5, the stop member 55 has a downwardly projecting wall or projection 77 providing stop surfaces 79 and 80. As shown in FIG. 4, and with reference to FIG. 5, stop surface 80 is in contact with the stop surface 74 of the upwardly projecting rib member 72 of valve body 17. When the stem is rotated 90° in a counterclockwise movement (hot water operation), the stop surface 79 of the stop member 55 contacts the stop 75 of the rib member 72. This movement is illustrated in FIG. 9 and results in the valve position as shown in FIG. 5. When the valve stem 19 is rotated in the previously described manner, the relief areas 41 and 42 of the movable valve element 39 will also move from the closed valve positions shown in FIG. 6 to that of FIG. 7 to allow water flow through openings 45 and 46.

FIGS. 4, 5, 8 and 9 also illustrate the reversing mechanism of the stop member 55. In order to effect a right hand or cold water operation of the valve assembly 10, the stop member 55 would be removed from the valve stem 19, rotated 90° and replaced on stem 19 with the stem 19 in the position shown in FIG. 4 and the valve closed. However, the projecting wall 77 would then be positioned as shown in FIG. 5 and located between a 3 o'clock and a 6 o'clock position. This positioning of the stop member would then allow a clockwise valve opening motion of the stem 19 and the valve components until the stop surface 80 engages the stop surface 74. This movement of the stop member 55 corresponds to the diagrammatic view of FIG. 8.

It should be noted that the stop member 55 is retained on the stem 19 by the projecting members 61–64 which include the resilient arms 57–60, respectively, with the projecting members 61–64 seated in the groove 70 adjacent the stop faces 66–69. As seen in FIG. 3, and when positioned thereon, the stop member 55 provides a retention of the valve stem 19 in the valve body 17 by the wall surfaces 76 and 78 abutting on shoulders 82 and 84 of the valve body 17, and the driving bar 28 engaging the valve body such at 87.

FIGS. 10–13 show an alternative embodiment wherein similar numbers are employed to show similar components as in valve assembly 10 except they have an "A" suffix. The major difference between the two embodiments is in the stop member 55A. Instead of having the four resilient arms extending upwardly as at 57–60 in embodiment 10, the resilient arms 57A–60A extend downwardly over the valve stem 19A to restrict axial movement of the stop member 55A along the valve stem 19A. Another difference is in the groove 70 of embodiment 10 which in this embodiment is discontinuous around the valve stem and is formed in four groove portions such as indicated at 71A and 70A in FIG. 10. Still another difference is the open compartment 95A at the top of the valve assembly 10A with the rib members 72A and 73A which provide stop surfaces 74A, 75A, and 88A, 90A for the stop member 55A.

Figure 8:
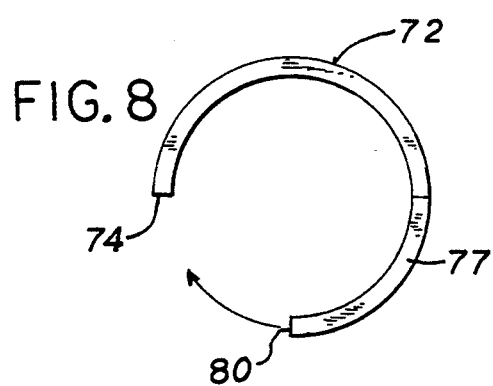
FIG. 8 is a diagrammatic view illustrating a right hand orientation of the valve assembly.

FIG. 12 shows the valve 10A in a closed position as indicated in FIG. 6 and for a cold water operation. When stem 19A is rotated clockwise as illustrated in FIG. 8, the valve 10A will open as illustrated in FIG. 7. Contact is thereby made by stop surface 80A with stop surface 88A.

The conversion of valve assembly 10A from a right hand operation as shown in FIG. 12 to a left hand operation as shown in FIG. 13, is the same as previously described for valve assembly 10. Referring to FIG. 12, and with the valve in the closed position, the stop member 55A with projecting walls 77A and 83A extending in a 12 to 3 o'clock position and a 6 to 9 o'clock position, would be removed from the stem 19A, rotated 90° and replaced as shown in FIG. 13 with the projecting walls 77A and 83A extending in the 3 o'clock to the 6 o'clock and 9 o'clock to the 12 o'clock positions. This affords a counterclockwise operation to open the valve as illustrated in FIG. 9. Rotation is limited by engagement of contact surfaces 86A and 90A.

The valve 10A is held in an assembled state by the bonnet 92A which is threaded onto the valve housing 11A such as by the threads 93A. Bonnet 92A engages the top surface of the valve body 17A as shown as 94A.

An important feature of the invention is the fact that the stop members 55 and 55A are positioned in an outward portion of the valve stems 19 and 19A such that the valve components do not have to be taken apart in order to convert the valve assemblies from a right to a left hand or vice versa operation. This is advantageous also in that the water supply to the valve does not have to be turned off. At the same time, a 90° orientation of the stop members on the valve stem provides a positive indication of conversion.

Another important feature is the retention of the valve stems 19 and 19A in the valve bodies 17 and 17A by the stop members 55 and 55A.

Thus, the invention provides an improved valve. While preferred embodiments have been described above, it is readily apparent to those skilled in the art that a number of modifications and changes may be made without departing from the spirit and scope of the invention. For example, while a faucet has been shown, the valve can be used with other types of fluid valves. Also, the specific materials mentioned are not the only materials which can be used. All such and other modifications within the spirit of the invention are meant to be in the scope of the invention.

I claim:

1. A fluid valve, comprising:
   a valve body having an axial bore for receiving fluid from an inlet and providing fluid to an outlet;
   at least one stop surface at an upper portion of the valve body;
   a stationary valve element and a movable valve element both positioned in the valve body for regulating fluid flow through the valve in response to rotation of the movable element over the stationary element;
   a rotatable spindle positioned within an upper end of the axial bore of the valve body, the spindle having one end extending outside the valve body and an opposite end for causing the movable valve element to move; and
   a stop member positionable around the spindle so as to rotate therewith, the stop member having a projection for abutting against the valve body stop surface in a rotational position of the spindle, the stop member also including at least one projecting member for engagement with a groove on the rotatable spindle so as to restrict axial movement of the stop member along the spindle.

2. The valve of claim 1, wherein the spindle and stop member are constructed and arranged so that when the stop member is axially removed from the spindle, rotated essentially 90° and axially repositioned on the spindle, the valve can be converted from a right hand to a left hand operation, or from a left hand to a right hand operation.

3. The valve of claim 1, wherein the projecting member has a plurality of resilient arms integrally formed with each other.

4. The valve of claim 1, wherein the spindle has two peripheral flat faces positioned essentially 90° from each other and positionable outside the valve body when the valve is assembled.

5. The valve of claim 1, wherein the valve body stop surface is defined by an outwardly projecting rib member which extends circumferentially about 180° from an upper surface of the valve body and has opposing stop surfaces.

6. The valve of claim 5, wherein the stop surface of the stop member is defined by an outwardly projecting wall portion which extends circumferentially about 90° from a lower surface of the stop member.

7. A removable cartridge valve for use in a faucet housing, the housing being of the type having at least one inlet in its bottom and a side outlet, the cartridge valve comprising:
   a valve body having an axial bore and an open lower end for fluid communication with the inlet in the bottom of the housing and at least one outlet in the valve body for fluid communication with the outlet in the housing;
   at least one stop surface at an upper portion of the valve body;
   a stationary valve element and a movable valve element both positioned in the valve body for regulating fluid flow through the valve in response to rotation of the movable element over the stationary element;
   a rotatable spindle sealed within an upper end of the axial bore of the valve body, the spindle having one end extending outside the valve body;
   a drive member connected to the movable valve and the spindle;
   at least two stop faces disposed on the spindle; and
   a stop member having at least one stop surface and at least one stop face for respective engagement with the valve body stop and the spindle stop faces, the stop member also including at least one projecting member for engagement with a groove on the rotatable spindle;
   the valve and the stop member being constructed and arranged so that when the stop member and the stop face of the stop member is removed from contact with one of the spindle stop faces, rotated and replaced so that the stop member stop face contacts another of the spindle stop faces, the valve can be converted from a right hand to a left hand operation or a left hand to a right hand operation.

8. The valve of claim 7, wherein the stop member is positioned outside the valve body.

9. The valve of claim 7, wherein the stop member is positioned in an open cavity member of the valve body.

* * * * *